(12) United States Patent
Collins et al.

(10) Patent No.: US 6,387,451 B1
(45) Date of Patent: May 14, 2002

(54) CURABLE COATING COMPOSITIONS

(75) Inventors: Alan Collins, Cardiff (GB); Antoon Peeters, Halle (BE)

(73) Assignee: Dow Corning Limited, Barry (GB)

( * ) Notice: Subject to any disclaimer, the term of this patent is extended or adjusted under 35 U.S.C. 154(b) by 0 days.

(21) Appl. No.: 08/679,603

(22) Filed: Jul. 11, 1996

Related U.S. Application Data

(63) Continuation-in-part of application No. 08/566,273, filed on Dec. 1, 1995, now abandoned.

(30) Foreign Application Priority Data

Dec. 6, 1994 (GB) ............................................... 9424580
Dec. 6, 1994 (GB) ............................................... 9424602

(51) Int. Cl.$^7$ ........................ D06M 11/78; C08G 77/08
(52) U.S. Cl. ........................... 427/387; 528/15; 528/31; 528/32; 8/DIG. 1; 8/115.6
(58) Field of Search ............................. 528/31, 32, 15; 427/387; 8/DIG. 1, 115.6

(56) References Cited

U.S. PATENT DOCUMENTS

| | | | | |
|---|---|---|---|---|
| 4,087,585 A | * | 5/1978 | Schulz | 428/429 |
| 4,754,013 A | * | 6/1988 | Antonen | 528/15 |
| 5,248,715 A | * | 9/1993 | Gray et al. | 524/265 |
| 5,254,656 A | * | 10/1993 | Bilgrien et al. | 528/15 |

FOREIGN PATENT DOCUMENTS

EP    596534 A2    5/1994

* cited by examiner

*Primary Examiner*—Margaret G. Moore
(74) *Attorney, Agent, or Firm*—James L. De Cesare; Robert L. McKellar

(57) ABSTRACT

A curable coating composition which exhibits improved cure and adhesion to various substrates comprises a composition curable by a hydrosilylation reaction and includes a silicone resin, a hydrosilylation reaction inhibitor and an adhesion promoting additive which comprises an organosilicon compound having epoxy and alkoxy functionalities, an alkenylsilanol, an organotitanium compound and a metal chelate compound.

7 Claims, No Drawings

CURABLE COATING COMPOSITIONS

This is a CIP application of Ser. No. 08/566,273, filed Dec. 1, 1995, and now abandoned.

This invention is concerned with curable coating compositions which adhere well to a variety of substrates.

Coating compositions are known which cure by a hydrosily-lation reaction without producing undesirable by-products. However, the said coating compositions do not adhere well to certain substrates, for example, synthetic textiles.

Priming a substrate with a primer composition prior to applying a curable coating composition is an effective solution. Primers are adequate to provide strong adhesion between a cured coating composition and a substrate. However, this solution suffers from the disadvantage that the coating process requires at least two steps, one step of which involves waiting for the applied primer composition to dry.

Self-adhering coating compositions are known which cure by a hydrosilylation reaction. They contain additives which aid adhesion to a variety of substrates, obviating the need for application of a primer composition prior to coating.

One example of a self-adhering coating composition is described in U.S. Pat. No. 4,087,585 wherein a coating composition curable by a hydrosilylation reaction is disclosed which comprises an adhesion promoting additive consisting essentially of a polyorganosiloxane containing a silicon bonded hydroxyl group, a silicon-bonded vinyl group and an epoxy silane.

U.S. Pat. No. 4,754,013 discloses a self-adhering coating composition curable by a hydrosilylation reaction which comprises an adhesion promoting additive consisting essentially of at least one hydroxyl terminated polydiorganosiloxane, at least one silane containing at least three alkoxy groups per molecule and a titanium compound as a catalyst.

The prior art compositions cited above will cure to form elastomeric materials which adhere well to inorganic substrates such as metal or glass and plastic materials in the case of U.S. Pat. No. 4,754,013 and inorganic substrates such as metals or glass in the case of U.S. Pat. No. 4,087,585, however, the onset of adhesion of these compositions to substrates is rather slow.

EP 596,534 discloses a curable polyorganosiloxane composition which exhibits initial adhesion to various substrates comprising a certain polyorganosiloxane composition which can be cured by addition reaction and a certain amount of an organosilicon compound comprising 1 to 20 mole % siloxane units with the general formula $R^4_e R^5_{1-e} SiO_{3/2}$; 20 to 80 mole % siloxane units with the general formula $R^4_f R^5_g R^6_h SiO_{2/2}$, and 20 to 80 mole % units with the general formula $R^4_i R^5_j R^6_k SiO_{1/2}$, wherein $R^4$ represents an alkenyl group, $R^5$ is a group selected from alkyl groups, alkoxyalkyl groups and epoxy-containing organic groups with the proviso that at least one of the preceding siloxane units in a molecule contains an epoxy-containing organic group as $R^5$; $R^6$ represents an alkoxy group having 1 to 4 carbon atoms, e, f, h and i are 0 or 1, g is an integer with a value of 0 to 2, f+g+h is 2, j is an integer with a value of 0 to 3, k is an integer with a value of 0 to 2, i+j+k is 3, with the proviso that $R^4$ comprises at least 2 mole % of the total silicon-bonded organic groups in the organosilicon compound and $R^6$ comprises at least 5 mole % of the total silicon-bonded organic groups in the organosilicon compound. However, the use of such complex polyorganosiloxane compounds in the curable composition is not desirable, as these materials are difficult and expensive to make. In addition, it is taught in EP 596,534 that to achieve the required initial adhesion, the compositions need to be cured for one hour in a hot air circulation oven at 150° C. There is a desire to reduce the time required to achieve initial adhesion of curable organopolysiloxane compositions preferably without the need to use complex materials.

It is an important criterion in the industrial manufacture of certain coated substrates, for example textiles, that the coating process and subsequent adhesive bond between substrate and cured coating is achieved as rapidly as possible to meet ever increasing demands on manufacturing output. There is a need therefore to provide a curable coating composition which may be coated easily onto a suitable substrate and which is able to cure rapidly and achieve adhesion to the suitable substrate quicker than heretofore possible without adversely affecting the physical properties of the cured material.

We have now found that we can provide curable coating compositions which may easily be coated onto a suitable substrate and cure thereon with concomitant rapid onset of adhesion by using certain compounds as adhesion promoting additives.

Therefore, in a first embodiment of this invention, there is provided a curable coating composition comprising (A) a composition curable by a hydrosilylation reaction, (B) an inhibitor of said hydrosilylation reaction, (C) a silicone resin and (D) an adhesion promoting additive comprising (i) an organosilicon compound having epoxy and alkoxy functionalities, (ii) an organotitanium compound (iii) an alkenyl functional silanol-terminated polyorganosiloxane and (iv) a metal chelate compound.

In a second embodiment of the invention, there is provided a curable coating composition comprising (i) a composition curable by a hydrosilylation reaction, (ii) an inhibitor of said hydrosilylation reaction, (iii) an adhesion promoting additive which is a reaction product of an epoxy-substituted alkoxysilane and an alkenyl-functional silanol-terminated organopolysiloxane and (iv) a metal chelate compound.

Curable coating compositions according to the invention are possessed of numerous advantages. Such coating compositions are able to cure and at the same time rapidly develop an adhesive bond to a variety of substrates, in particular certain synthetic textiles, for example polyesters, and polyamides, e.g. nylon 66. Thereafter the cured coating compositions exhibit good resistance to washing and the adhesive bond to a suitable substrate is still acceptable after numerous wash cycles in hot aqueous detergent solutions. Component (A) of the first embodiment of the curable coating composition according to the invention is a composition curable by a hydrosilylation reaction. Operative compositions are those well known in the art which comprise a polyorganosiloxane having at least two silicon-bonded alkenyl groups per molecule, an organohydrogensiloxane having at least three silicon-bonded hydrogen atoms per molecule and a noble metal catalyst. Organopolysiloxanes having at least two silicon-bonded alkenyl groups per molecule are well known in the art and may vary from viscous materials to freely flowing liquids. It is preferred that at least some, preferably most of the organopolysiloxanes having silicon-bonded alkenyl groups have a viscosity of not greater than 100 Pa.s at 25° C., more preferably 20 to 60 Pa.s at 25° C. They may be homopolymers, copolymers or mixtures thereof which comprise units of the general formula $R_a R'_b SiO_{[4-a+b)]/2}$ wherein R is a monovalent hydrocarbon group, R' is a monovalent unsaturated hydrocarbon group, a is 0, 1, 2 or 3 and b is 0 or 1 provided that a+b is not greater than 3. The organohydrogensiloxanes of component (A) contain curing agents for the hydrosilylation reaction and are well known in the art. They may vary from viscous materials to freely flowing liquids. Preferred materials have a viscosity of not greater than 500 Mpa.s at 25° C., more preferably 5 to 55 Mpa.s at 25° C.

They may be homopolymers, copolymers or mixtures thereof which comprise units of the general formula $R_aH_bSiO_{[4-(a+b)]/2}$ wherein R, a and b are as hereinabove defined.

The component (A) also comprises a noble metal catalyst for the reaction of the aforementioned alkenyl substituted polyorganosiloxane with the organohydrogensiloxane. The noble metal catalyst may be a rhodium or platinum containing material. Platinum catalysts are preferred and may take any of the known forms, ranging from platinum deposited onto carriers, for example, powdered charcoal, to platinic chloride, salts of platinum, chloroplatinic acids and encapsulated forms thereof. A preferred form of platinum catalyst is chloroplatinic acid either as the commonly obtainable hexahydrate or in the anhydrous form. Platinum complexes may also be used, e.g. those prepared from chloroplatinic acid hexahydrate and divinyltetramethyl disiloxane.

The component (i) of the second embodiment of this invention uses essentially the same hydrosilylation materials and the same reaction for cure as found in component (A), supra.

Curable coating compositions according to the invention comprise a hydrosilylation reaction inhibitor (B). Inhibitors for hydrosilylation reactions, especially those catalysed by platinum-based catalysts, are well known in the art and may include, for example, acetylenic alcohols, dialkylmaleates, primary alcohols or mixtures thereof. A hydrosilylation reaction inhibitor is preferably present in a curable coating composition in a proportion sufficient to ensure that the coating composition cures in not less than 30 seconds at 150° C. If no hydrosilylation reaction inhibitor is present then the adhesion of the coating composition to a substrate may be negatively influenced and if the concentration of the inhibitor is too high the composition may fail to cure quickly enough. The applicants believe, although not wishing to be bound by this theory, that paucity of inhibitor leads to the coating composition curing so rapidly that the adhesion promoting additive is effectively trapped in the cured coating composition before sufficient quantities of the adhesion promoting additive can reach the coating substrate interface.

Hydrosilylation reaction inhibitors (ii) of the second embodiment of the invention are essentially identical to the hydrosilylation reaction inhibitors (B) of first embodiment, supra.

Silicone resin (C) may be any silicone compound having a resinous structure but is preferably a MQ resin, i.e. a resin consisting essentially of monovalent siloxane units M and tetravalent siloxane units Q and is preferably a resin consisting essentially of M units $R'R_2SiO_{1/2}$ and $R_3SiO_{1/2}$ and Q units $SiO_{4/2}$ in which R and R' are as aforesaid, provided there is at least one R' group present per molecule. It is preferred that R denotes an alkyl or aryl group, preferably having from 1 to 18 carbon atoms, more preferably an alkyl group having up to 8 carbon atoms, e.g. methyl, ethyl, isopropyl, hexyl or octyl. Preferably R' is an alkenyl group having terminal unsaturation (i.e. unsaturation between the two carbon atoms which are furthest removed from the silicon atom), more preferably an alkenyl group having from 2 to 8 carbon atoms, most preferably a vinyl group, there being no more than 10% by weight of vinyl groups per molecule, more preferably, 1 to 5% by weight of vinyl groups per molecule. The resin may be in solid or liquid form although the inventors prefer the ratio of the units M to the units Q to be such that the resin is a solid at ambient temperature and pressure, e.g. with a M/Q ratio of from 0.6/1 to 1.8/1, more preferably 1.2/1 to 1.6/1. Preferably the resin is provided as a 60% solution in a solvent, e.g., xylene or toluene.

Preferably the silicone resin (C) is present in a curable coating composition according to the invention as the sole reinforcing agent. The resin is chosen for its strongly reinforcing properties and the physical properties of the cured material resultant therefrom, but equally as important, the resin provides reinforcement without thickening the curable coating composition to the point where the viscosity becomes so great that it no longer has utility as a coating composition. It is a feature of this invention that a curable coating composition cannot tolerate significant amounts of other reinforcing fillers, for example fumed or precipitated silicas of surface areas above 100 $m^2/g$ which have the effect of dramatically increasing the viscosity of the coating composition of this invention. Very small amounts, however, which do not significantly affect the viscosity would not be detrimental, although these reinforcing fillers are preferably avoided altogether.

The composition of the second embodiment of this invention preferably also comprises a silicone resin e.g. a component (C) supra, but such a resin is not required in the second embodiment composition.

Adhesion promoting additive (D) of the coating composition according to the first embodiment of the invention comprises an organosilicon compound having epoxy and alkoxy functionalities, D(a). These materials are well known in the art and numerous examples of this type are described in U.S. Pat. No. 3,455,877. The alkoxy radicals of the component D(a) may be the same or different and are usually selected from alkoxy radicals having from 1 to 4 carbon atoms, for example, methoxy or ethoxy. Any other substituents, when present, are preferably selected from alkyl groups having from 1 to 8 carbon atoms. Suitable organosilicon compounds D(a) are preferably low molecular weight materials, e.g. linear or branched organosiloxane polymers having no more than 10 silicon atoms per molecule. More preferred are silanes having only epoxy and alkoxy groups. The preferred epoxy-substituted alkoxysilanes are functionalised with an organic substituent bearing an epoxy group, the nature of which may vary widely. Suitable silane materials include, by way of example, 3-glycidoxy propyltrimethoxysilane, and (3,4 epoxycyclohexyl) ethyltrimethoxysilane and (D)(a) is preferably used at concentrations of from 0.1 to 2% by weight of the total weight of the coating composition according to the invention, more preferably 0.3 to 1%. It was found, however, that the higher amounts are preferred when the composition is to be applied to certain textile substrates, e.g. polyester.

Component D(b) present in the adhesion promoting additive is an organotitanium compound. This compound serves to catalyse the reaction of the components of adhesion promoting additive (D). Component D(b) may be any organotitanium compound having organic groups attached to titanium through a titanium-oxygen-carbon linkage. The two main types of compounds falling within this definition are the ortho-esters, that is the alcoholates, and the acylates in which the organic group is derived from a carboxylic acid. The organotitanium compound may also contain both alcoholate and acylate groups attached to the same titanium atom. Operative organotitanium compounds thus include those of the formula Ti(OR")$_4$ wherein R" is alkyl, alkoxy-alkyl or acyl, for example tetraisopropyltitanate, tetramethoxyethoxy-titanate and diisopropyldiacetoxytitan-ate. The preferred organotitanium compounds for use in this invention are the chelated or partially chelated titanium compounds. These materials are produced, for example, by reacting an alcoholate as referred to above with a diketone or a derivative thereof. More preferred are those partially chelated titanium compounds having two alcoholate groups attached to titanium. The most preferred organotitanium compounds are those wherein the two alcoholate groups are composed of more than 3 carbon atoms, for example, bis-(diethyleneglycoxy)-titanium-(2,4-pentanedionate). The presence of an organotitanium compound in the adhesion promoting additive (D) promotes the rapid onset of adhesion of the curable coating composition to suitable substrates. In addition, the ability to promote rapid onset of adhesion does not deteriorate over time. The most preferred organotitanium compounds do not produce toxic vapour by-products or unpleasant odours which accompany use of certain organ-otitanium compounds. Component D(b) may be employed in an adhesion promoting additive (D) in a proportion of from 10 to 100 parts by weight and preferably 40 to 80 parts by weight per 100 parts by weight of component D(a).

Alkenyl functional silanol terminated polyorganosilox-ane (c) of adhesion promoting additive (D) comprises units according to the general formula $R^2_c R'SiO_{(3-c)/2}$ and $R^2_d SiO_{(4-d)/2}$ wherein $R^2$ denotes an alkyl group having from 1 to 8 carbon atoms or an aryl group having from 6 to 8 carbon atoms, R' is as aforementioned, c is 1 or 2 and d is 1, 2 or 3. Preferably, component D(c) has the formula H—(OSiR$^2_2$)$_n$ (OSiR$^2$R')$_m$—OH wherein $R^2$ and R' are as defined above, R' preferably having from 2 to 8 carbon atoms, n is from 1 to 6, more preferably 2 to 5 and m is from 1 to 6, more preferably 1 to 3. The most preferred material has from 10% to 15% by weight of silicon-bonded alkenyl groups, e.g., vinyl groups, per molecule. The most preferred component D(c) has a relatively low alkenyl content and will not significantly compete with the hydrosilylation reaction of component (A) of a coating composition according to the invention. Component D(c) may be employed in an adhesion promoting additive (D) in proportions of from 50 to 100 parts by weight, preferably 70 to 100 parts by weight per 100 parts of component D(a).

Metal chelate compounds (d) of adhesion promoting additive (D) enhance the adhesion promoting characteristics of additive (D). Any metal chelate which is compatible with the composition and which does not interfere with the hydrosilylation reaction of reagents of component (A) is suitable. Suitable metal chelates include acetylacetonates e.g. triacetyl acetonates of aluminium, tetraacetyl acetonates of zirconium and triacetylacetonates of iron. Aluminium chelates are preferred for example, aluminium may be chelated with 1,3-diketones, e.g., acetylacetonate or hydroxycarboxylic acids, e.g., tartaric acid; the preferred aluminium chelate is, however, aluminium acetylacetonate. Aluminium chelates enhance and increase the rate of adhesion of a composition according to the invention, to a suitable substrate. The metal chelate may be present in a composition according to the invention in proportions of from 1 to 50 parts by weight, preferably 1 to 3 parts by weight per 100 parts of component (a) or 0.004 to 0.2% by weight of the composition. However, higher levels of metal chelate impair flame resistance of curable coating compositions according to the invention.

The adhesion promoting additive (D) may be present in a curable coating composition according to the invention in an amount which is 0.1% to 3.2% by weight of the total weight of the curable coating composition.

In the second embodiment of the invention, the adhesion additive is comprised of an adhesion promoting additive which is (iii) a reaction product of an epoxy-substituted alkoxysilane and an alkenyl-functional silanol-terminated organopolysiloxane.

Further, the second embodiment composition also includes a fourth component (iv) a metal chelate compound. In addition, this composition can also contain an organotitanium compound, but the organotitanium compound is not required in the second embodiment composition.

Other adjuvants may be added to compositions according to the invention, for example, extending fillers, e.g., ground quartz, metal carbonates, pigments, catalyst inhibitors, heat stabilisers and bath life extenders.

One type of curable coating composition according to the invention may be formed simply by mixing the components (A), (B), (C) and (D) of the first embodiment composition.

Another type of curable coating composition according to the invention may be formed by simply mixing the components (i), (ii), (iii), and (iv) of the second embodiment composition.

The curable coating compositions may be provided in one part although it is preferred for storage stability reasons to provide a composition according to the invention in two or more parts, most preferably two parts. A two part composition may then be mixed in the required proportions prior to use. It is important to distribute the components over the two or more parts of the composition in the correct fashion to obtain storage stability. The compositions may accordingly be formulated in a number of ways provided that the organohydrogensiloxane and the noble metal catalyst of the component (A) or (i) are stored separately. Components (a) and (c) are also preferably stored separately. As noted above, pre-reacted combinations of (a) and (c) can be used. A preferred method of storing a two part composition comprises storing in a first part of the composition an alkenyl polyorganosiloxane, resin (C), a noble metal catalyst, the components (D)(a), (c) and (d) optionally with an extending filler and in a second part the organohydrogensiloxane of component (A) and the organosilicon compound having epoxy and alkoxy functionalities (D)(a) with inhibitor (B). The two parts preferably combine the reactants in a way which permits mixing the two parts in a 10:1 to 5:1 weight ratio. Curable coating compositions when mixed may have a viscosity appropriate to application machinery and textiles to be coated, generally in the range 2 Pa.s to 20 Pa.s at 25° C. Preferred materials have a viscosity in the range 20 to 120 Pa.s at 25° C. and cure within 1 to 4 minutes at a temperature of 150° C. to 180° C. to provide elastomeric materials. Compositions according to the invention typically remain at workable viscosities for at least 24 hours when stored at temperatures up to 40° C.

Curable coating compositions according to the present invention are useful as coatings for a number of substrates, for example, fibrous materials, e.g., papers and textiles, glass and metals. The coating compositions of this invention are particularly suitable as coatings for synthetic textiles, for example, polyester and nylon woven fabrics. They may be used as protective coatings, as coatings to reduce permeability of the substrate, e.g. textile to gases e.g. air or for any other purpose for which curable coating compositions have been used, for example tear strength, abrasion resistance, hydrophobicity or impact resistance.

Compositions according to the invention may be coated onto suitable substrates by those coating techniques common to the art, for example, gravure blade coating and screen printing.

According to another aspect of the invention, there is provided a method of coating a synthetic textile which comprises the steps of applying to a synthetic textile a curable coating composition according to the invention and allowing the coated composition to cure. Curing may be done by any suitable method, including heating or radiation, heating being the preferred method, preferably at temperatures of from 100 to 200° C., more preferably 140 to 180° C. One major advantage is that good adhesion is achieved after relatively short curing times, which may range from 30 seconds to an hour, preferably from 1 to 30 minutes, most preferably 1 to 15 minutes at 150° C. It is clear that an increase in curing temperature will allow the shortening of the curing time.

In yet another aspect of the invention, there is provided a synthetic textile which is coated with a curable coating composition according to the invention, and a textile which has adhered thereto a cured coating composition according to the invention. There now follows a description of two examples which serve to illustrate the invention. All parts and percentages are by weight unless otherwise stated.

Two part curable coating compositions used in the examples were formed according to the procedure described below.

Curable Coating Composition C

Part A of a curable coating composition (C) was formed by mixing 45 parts of a vinyl end-blocked polydimethylsiloxane having a viscosity of 55 Pa.s. at 25° C. and a vinyl content of 0.08%, 17 parts of a vinylated hydrophobic polysilicate resin, 0.1 part of a platinum complex catalyst containing 0.63%w/w platinum, 31 parts of ground quartz plus 5 parts of calcium carbonate and 0.3 parts of isopropyl titanate.

Part B of a curable coating composition C was formed by mixing 55 parts of a vinyl end-blocked polydimethylsiloxane having a viscosity of 0.45 Pa.s. at 25° C., 40 parts of a crosslinker comprising an organohydrogensiloxane having at least three silicon-bonded hydrogen atoms per molecule and a viscosity of 32 MPas at 25° C., 0.4 parts of α-glycidoxypropyltrimethoxysilane.

Parts A and B were mixed in a 10:1 weight ratio to form the curable coating composition C. This composition contains no adhesion promoting additive and serves as a comparative composition. It was applied to a blue dyed polyester fabric by a knife on air coater and heated to 150° C. Cure of the composition was inhibited and a sticky mass formed. Also, adhesion of the composition C to the fabric was insufficient to withstand a 1000 scrub test using a 500 g weight.

One Method According to the Invention

A part A1 was prepared by adding to 100 parts of Part A 0.3 parts of the platinum complex catalyst, 0.45 parts of the vinyl end-blocked polydimethylsiloxane having a viscosity of 55 Pa.s at 25° C., 0.17 parts of the polysilicate resin, 0.3 parts of aluminum acetonyl acetonate and 1 part of the reaction product obtained by heating at 150° C. in the presence of KOH of 1 part of α-glycidoxy-propyltrimethoxsilane and 1 part of a hydroxy-terminated methyvinyl polysiloxane having a viscosity of from about 28 to about 35 Cst.

Parts A1 and B were mixed in a 10:1 weight ratio to provide an illustrative curable coating composition. The composition, when mixed, had a viscosity of 50 Pa.s It was applied to the blue dyed polyester fabric used in Example 1 by a knife on air coater to form a coating on the fabric and was heated to 170° C. for 3 to 4 minutes. This coating procedure was repeated to apply two further layers of coating over the first, giving a final coating weight of 110 grams per square meter. Upon cooling, it was found that the coating was a non-tacky, fully cured coating strongly adherent to the fabric. The coated fabric was subjected to a standard scrub test with a 500 g weight and withstood more than 1000 cycles.

Curable Coating Composition C1

Part A of a curable coating composition C1 was formed by mixing 46.2 parts of a vinyl end-blocked polydimethylsiloxane having a viscosity of 55 Pa.s at 25° C. and a vinyl content of 0.08%, 17.1 parts of a hydrophobic polysilicate resin having vinyldimethyl siloxane units, 0.1 part of a platinum complex catalyst containing 0.63% w/w platinum, 30.9 parts of ground quartz and 5 parts of calcium carbonate.

Part B of a curable coating composition C1 was formed by mixing 54.8 parts of a vinyl end-blocked polydimethylsiloxane having a viscosity of 0.45 Pa.s at 25° C., 40.5 parts of a crosslinker comprising an organohydrogensiloxane having at least three silicon-bonded hydrogen atoms per molecule and a viscosity of 32 Mpa.s at 25° C. and 0.4 parts of ethynyl-cyclohexanol as an inhibitor.

Part A and Part B were mixed in a 10:1 weight ratio to form the curable coating composition C1. This composition contains no adhesion promoting additive and serves as a comparative composition.

Curable Coating Composition C2

0.45 parts of a dimethyl methylvinyl siloxy silanol end-blocked copolymer having a hydroxyl content of 9% and a vinyl content of 10% by weight was mixed with 100 parts of part A as described above to form a part A2.

Four and one-half parts of epoxypropyltrimethoxysilane was mixed with 100 parts of part B as described above to form a part B2.

Part A2 and part B2 were mixed in a 10:1 weight ratio to form a curable coating composition C2, which contains no organotitanium or metal chelate compound and thus also serves as a comparative composition.

Curable Coating Composition C3

One quarter of a gram of bis (ethyleneglycoxy)-titanate-(2,4,pentane-dionate) was mixed with 100 parts of part A2, as described above to form a part A3 and the resultant mixture was mixed in a 10:1 weight ratio with part B2 as described above to form a curable coating composition C3, which contains no metal chelate and also serves as a comparative composition.

Curable Coating Composition C4

A part B4 was formed according to the method of B2 except that the ethynylcyclohexanol inhibitor was omitted. To 100 parts of part A3 as described above, was added 1.4 parts of aluminium acetyl acetonate in toluene to form part A4, of which 100 parts were mixed with 9.96 parts of part B4 to form a curable coating composition C4, which does not contain a hydrosilylation reaction inhibitor and serves as a comparative composition.

Curable Coating Composition 1

100 parts of part A4, as described above, were mixed in a 10:1 weight ratio with part B2 to form a curable coating composition 1, which is illustrative of the invention.

Curable Coating composition 2

Curable coating composition 2 was prepared by adding 0.4 parts of epoxypropyltrimethoxysilane to 100 parts of composition 1, and is also illustrative of the invention.

Curable Coating Composition 3

Curable coating composition 3 was prepared by adding 0.4 parts of the epoxypropyltrimethoxysilane plus 0.4 parts of the dimethylmethylvinylsiloxysilanol end-blocked copolymer to 100 parts of composition 1, and is also illustrative of the invention.

EXAMPLE 1

1.2 parts of each of the curable coating compositions 1 and C1 to C4 were pipetted onto a substrate consisting of a piece of woven nylon fabric (4 cm×4 cm) partially over-laid with a piece of release paper (2 cm×4 cm) such that the sample coated both the nylon fabric and the release paper. The coatings thus deposited were then heated in an oven at 150° C. in order to effect cure and adhesion to the substrate. Upon removal from the oven the coated release paper was lifted from the nylon fabric and gripped by an operator at 90° to the coated nylon fabric surface. Each coating in turn was then slowly hand pulled from the nylon surface until the entire coating was removed or the coating broke.

The quality of adhesion of a coating to the nylon fabric was assessed by determining the failure mode when the coating was removed. The area of nylon, from which the coating was removed, was inspected and if 50% or more was still covered by cured elastomeric material, the failure was deemed "cohesive". All compositions cured in less than 1 minute but in most cases adhesion only developed after longer periods.

The tests were carried out repeatedly to determine the minimum time required for cohesive failure to occur. Table I contains the findings for compositions 1, C1, C2, C3 and C4.

TABLE I

Quality of adhesion of curable coating compositions

| Composition | Time[a] | Cure | Cohesive Failure |
|---|---|---|---|
| 1 | 1 | yes | yes |
| C1 | 35 | yes | no[b] |
| C2 | 8 | yes | no[b] |
| C2 | 10 | yes | yes |
| C3 | 1 | yes | no[b] |
| C3 | 3 | yes | yes |
| C4 | 35 | yes | no[b] |

[a]= Residence time in oven at 150° C. in minutes.
[b]= Total adhesive failure.

EXAMPLE 2

The curable coating compositions 1, 2, 3, C1 and C3 were each coated onto a polyester textile. The coatings were cured for 15 minutes at 150° C. The coated textile samples were then boil washed in 5% w/w aqueous solutions of detergent powder (Persil®) for up to 8 hours. The adhesive peel strength as measured by a 180° C. Peel Test for each sample before washing, after 5 hours and after 8 hours. The results are shown in Table II.

TABLE II

Effect of washing on adhesive strength

| | Peel Strength (N/cm) | | |
|---|---|---|---|
| Composition | Pre wash | 5 h | 8 h |
| 1 | 6.8 | 1.4 | 1.1 |
| 2 | 10.8 | 8.5 | 5.7 |
| 3 | 12.6 | 9.2 | 4.8 |
| C1 | NM | NM | NM |
| C3 | 3.8 | 1.3 | 0.6 |

NM = Force was too low to be measured.

From the examples, it is clear that coating compositions according to the invention have excellent adhesion after a very short curing time.

That which is claimed is:

1. A method of coating a synthetic textile comprising the steps of
   (I) applying a coating composition comprising
      (A) a composition curable by a hydrosilylation reaction,
      (B) an inhibitor of said hydrosilylation reaction,
      (C) a silicone resin and
      (D) an adhesion promoting additive comprising
         (i) an organosilicon compound having epoxy and alkoxy functionalities,
         (ii) an organotitanium compound,
         (iii) an alkenyl functional silanol terminated polyorganosiloxane and,
         (iv) a metal chelate compound, to the synthetic textile and thereafter
   (II) allowing the coating composition to cure.
2. A method of coating a synthetic textile according to claim 1 wherein the metal chelate compound (iv) used in step (I) is an aluminium chelate compound.
3. A method of coating a synthetic textile according to claim 1 wherein the organotitanium compound (ii) used in step (I) is selected from the group consisting of titanium alcoholates and titanium acylates.
4. A method of coating a synthetic textile according to claim 1 wherein the silicone resin (C) used in step (I) is a resin consisting essentially of
   (a) monovalent siloxane units M of the formula

   R'R$_2$RSiO$_{1/2}$;

(b) monovalent siloxane units M of the formula R$_3$SiO$_{1/2}$ and,
   (c) tetravalent siloxane units Q of the formula SiO$_{4/2}$
   wherein R denotes a monovalent hydrocarbon group and R' denotes a monovalent unsaturated hydrocarbon group.
5. A method of coating a synthetic textile according to claim 1 wherein the alkenyl functional silanol-terminated polyorganosiloxane (D)(iii) is according to the formula

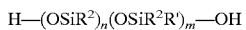
   H—(OSiR$^2$)$_n$(OSiR$^2$R')$_m$—OH wherein R$^2$ is selected from the group consisting of an alkyl group having from 1 to 8 carbon atoms and an aryl group having 6 to 8 carbon atoms, R' is an unsaturated hydrocarbon group having from 2 to 8 carbon atoms, n is from 1 to 6 and m is from 1 to 6.
6. A synthetic textile fabricated by the steps comprising
   (I) coating a synthetic textile with a composition comprising
      (A) a composition curable by a hydrosilylation reaction,
      (B) an inhibitor of said hydrosilylation reaction,
      (C) a silicone resin and
      (D) an adhesion promoting additive comprising
         (i) an organosilicon compound having epoxy and alkoxy functionalities,
         (ii) an organotitanium compound,
         (iii) an alkenyl functional silanol-terminated organopolysiloxane and
         (iv) a metal chelate compound, and thereafter
   (II) curing said composition.
7. A synthetic textile according to claim 6 wherein the metal chelate compound (iv) used is an aluminium chelate compound.

* * * * *